Figure 1:
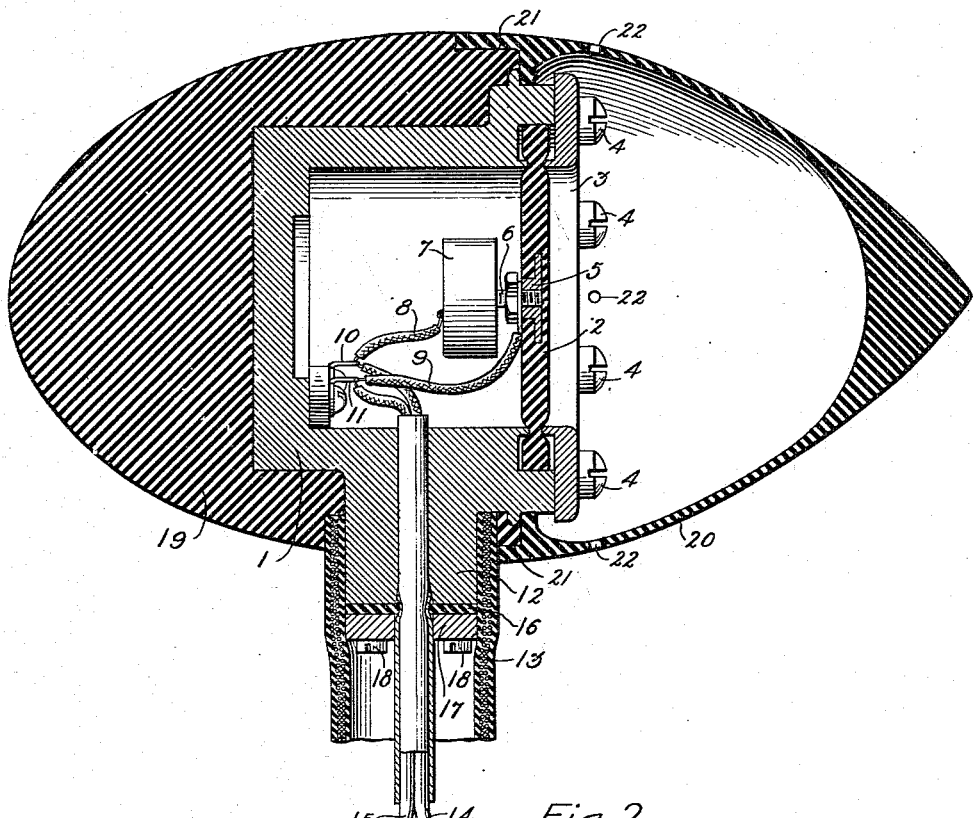

G. B. THOMAS.
ACOUSTIC DEVICE.
APPLICATION FILED AUG. 9, 1918.

1,345,717.

Patented July 6, 1920.

Inventor:
George B. Thomas.
by J. G. Roberts Att'y.

UNITED STATES PATENT OFFICE.

GEORGE B. THOMAS, OF WYOMING, NEW JERSEY, ASSIGNOR TO WESTERN ELECTRIC COMPANY, INCORPORATED, OF NEW YORK, N. Y., A CORPORATION OF NEW YORK.

ACOUSTIC DEVICE.

1,345,717.      Specification of Letters Patent.      Patented July 6, 1920.

Application filed August 9, 1918. Serial No. 249,066.

*To all whom it may concern:*

Be it known that I, GEORGE B. THOMAS, a citizen of the United States, residing at Wyoming, in the county of Essex and State of New Jersey, have invented certain new and useful Improvements in Acoustic Devices, of which the following is a full, clear, concise, and exact description.

The invention relates to a vibration detecting device and more particularly to a shield for protecting such device from transitory disturbances in the medium in which the device is placed. It has been proposed in connection with the detection of the presence of submarine vessels to employ a vibration responsive device which is adapted to be submerged in the water and which responds to vibrations propagated through the water due to the presence therein, at a distant point, of a submarine boat. The vibration responsive element of such a device may be utilized either to set up vibrations in an air column which vibrations may be conducted to the ears of an observer as in the ordinary stethoscope, or to vary the characteristics of an electrical circuit including a telephone receiver to reproduce in the telephone receiver the vibrations which are detected. In utilizing a detecting device of this character, it is usual to support the device from a moving vessel, or from a float or buoy. In some cases the detecting device is supported by a framework resting on the sea bottom. In any case, the device is subjected to local disturbances due to variations in pressure in the water, mechanical shocks or mechanical vibrations of a transitory character due to turbulency of the water surrounding the device.

It is an object of the present invention to protect the vibration responsive element of the device from the effects of such transitory vibrations, and in accordance with the invention, this object is attained by means of a shield of energy absorbing material such as soft rubber which is adapted to intercept and absorb the transitory vibrations without materially interfering with the transmission of sustained vibrations to the vibration responsive element. It has been found by experiment that transitory vibrations are absorbed or reflected by a shield of this character whereas sustained vibrations such as those due to vibrations produced by the machinery of a submarine boat or other source of sound are transmitted through the shield without substantial loss in amplitude.

Also in accordance with the invention, a perforate shield is employed so as to permit direct access of the medium in which the device is submerged to the vibration responsive element, so that a body of such medium is included between the shield and the vibration responsive element.

Figure 2:
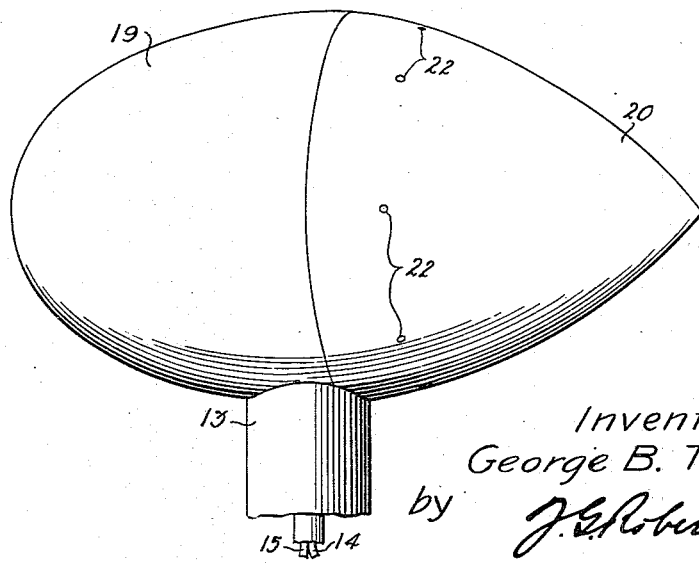

The invention will be best understood by reference to the accompanying drawing in which Figure 1 illustrates in longitudinal section one embodiment of the invention, and Fig. 2 a side elevation of the same. The device shown in the drawing, which is particularly adapted for towing from a moving vessel, comprises a metallic cup-shaped member indicated at 1, the open end of which forms a support for a soft rubber diaphragm 2 of considerable thickness. This soft rubber diaphragm is held in position over the open end of the cup by means of a clamping ring 3 secured to the cup by the machine screws 4. Embedded in the diaphragm 2 is a bushing 5 which is internally threaded and forms a support for the threaded stem 6 of an inertia type microphonic button 7. This button 7 may be of any well-known type of microphonic button, although the form which is preferable to use is disclosed in an application of C. A. Finley, Serial No. 228,609, filed April 15, 1918. The electrodes of the microphonic button 7 are electrically connected by means of the conductors 8 and 9 to the binding posts 10 and 11 secured within the cup and insulated therefrom. The cup is provided with a cylindrical projection 12 from one of its side walls, which is surrounded by an ordinary piece of rubber hose 13 that provides a waterproof protector for the conductors 14 and 15 leading to the towing vessel and there associated with a suitable source of potential and a telephone receiver, whereby variations in the resistance of the microphonic button 7 caused by vibrations of the diaphragm 2 are translated into audible sounds in the telephone receiver. Conductors 14 and 15 pass, as shown, through a central bore in the projection 12 of the cup. A stuffing box to prevent the entrance of moisture through the bore containing the conductors is provided and consists of a washer 16 of rubber or similar material and a clamping washer of metal 17 secured in place by the screws 18. The entire cup is embedded in a mass of rubber 19 and the open end of the cup, together with the diaphragm 2 mounted therein, is completely surrounded by a hollow shield 20, also of soft rubber. The shield may be held in place in any well-known manner, although it is preferable to cement it to the mass of rubber 19 surrounding the cup at the junction point 21 between the shield and such mass of rubber. The shield is provided with apertures 22 which permit the ingress of water within the space included between the shield and the diaphragm 2. Since the diaphragm is clamped over the open end of the cup by means of the clamping ring 3, the diaphragm itself serves to exclude the water entering the apertures of the shield from the interior of the cup.

When the device is in use, it is submerged and ordinarily towed by a moving ship. The shape of the device as shown is such that it offers very little resistance to the water in passing through it. Of course, as soon as the device is submerged, the chamber formed by the diaphragm and the shield is immediately filled with water. Shocks and variations in pressure due to the turbulency of the water surrounding the device and due to the moving of the device through the water, do not disturb the diaphragm 2 to such an extent as to cause noises in the telephone receiver associated with the microphonic button. However, sustained vibrations, such as those due to sound waves propagated through the water, are transmitted through the shield and through the water included between the shield and the diaphragm to the diaphragm and consequently cause the diaphragm to vibrate in synchronism therewith. The vibrations of the diaphragm are translated into variations in an electrical circuit by means of the microphonic button 7 and these variations in the electrical circuit are retranslated into audible effects by means of a telephone receiver.

While the shape of the shield shown in the drawings is the shape which appears to be the most efficient, obviously the invention is not limited to any particular shape of shield.

What is claimed is:

1. A vibration detector comprising a vibration responsive device and a perforate shield of energy absorbing material for protecting said device from transitory vibrations.

2. A vibration detector comprising a vibration responsive diaphragm, a perforate shield for said diaphragm forming with it a chamber adapted to inclose a body of the medium in which the device is immersed.

3. A vibration detecting device comprising a cup, a diaphragm mounted on the open end of said cup, a perforate shield of energy absorbing material inclosing the exposed side of said diaphragm.

4. A vibration detecting device comprising a vibration responsive element, a dome shaped shield of perforate energy absorbing material partially inclosing the said vibration responsive element and shielding it from transitory vibrations.

5. A vibration detecting device comprising a cup, a diaphragm mounted on the open end of said cup, a means of energy absorbing material surrounding said cup, and a shield of perforate energy absorbing material inclosing the exposed side of the diaphragm.

In witness whereof, I hereunto subscribe my name this 6th day of August, A. D. 1918.

GEO. B. THOMAS.